United States Patent
Friske

(10) Patent No.: US 7,784,334 B2
(45) Date of Patent: Aug. 31, 2010

(54) CAMBER ANGLE OPTIMIZATION FOR A BIAXIAL WHEEL TEST MACHINE

(75) Inventor: David Douglas Friske, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 12/192,619

(22) Filed: Aug. 15, 2008

(65) Prior Publication Data

US 2010/0037714 A1 Feb. 18, 2010

(51) Int. Cl.
*G01N 19/00* (2006.01)

(52) U.S. Cl. ............... 73/117.01; 73/146; 73/865.9

(58) Field of Classification Search .......... 73/117.01, 73/146, 865.9
See application file for complete search history.

(56) References Cited

U.S. PATENT DOCUMENTS

| 3,985,245 A | | 10/1976 | Schulte |
|---|---|---|---|
| 4,419,901 A | | 12/1983 | Ruppert et al. |
| 6,116,084 A | * | 9/2000 | Fischer et al. ............ 73/146 |
| 6,338,270 B1 | * | 1/2002 | Mancosu et al. .......... 73/146 |
| 6,382,020 B1 | * | 5/2002 | Fischer et al. ............ 73/146 |
| 6,761,060 B2 | * | 7/2004 | Mancosu et al. .......... 73/146 |
| 6,813,938 B2 | | 11/2004 | Schwendemann |
| 7,254,995 B2 | * | 8/2007 | Leska et al. .............. 73/146 |
| 2008/0144985 A1 | * | 6/2008 | Joki et al. ................. 384/448 |
| 2010/0031740 A1 | * | 2/2010 | Olex et al. ................ 73/146 |

OTHER PUBLICATIONS

MTS Model 855 Multiaxial Wheel Fatigue System, MTS Systems Corporation, pp. 1-2.
(WO/2001/071307) Control Method for a Bi-Axial Wheel Bench for Engine Test Driving Stresses and a Bi-Axial Wheel Test Bench, pp. 1-3.
SAE International, Development of SAE Biaxial Wheel Test Load File, www.sae.org/technical papers/2004-01-1578, pp. 1-2.
Schwendemann, Measurement and Control Method for the Determination of Control Parameters for a Biaxial Wheel Test Rig (ZWARP) from Wheel Forces Measured During Road Tests, Mar. 7, 2001, pp. 1-14.

* cited by examiner

*Primary Examiner*—Lisa M Caputo
*Assistant Examiner*—Freddie Kirkland, III
(74) *Attorney, Agent, or Firm*—Frederick Owens; Brooks Kushman P.C.

(57) ABSTRACT

A method for controlling a biaxial wheel test machine used for simulating loads experienced by a test wheel under actual driving conditions and for obtaining an accurate determination of wheel camber angle.

7 Claims, 1 Drawing Sheet

CAMBER ANGLE OPTIMIZATION FOR A BIAXIAL WHEEL TEST MACHINE

BACKGROUND OF THE INVENTION

1. Field of the Invention

A method for controlling a biaxial wheel test machine to provide accurate wheel camber, or tilt, angle information to data relating to potentially damaging forces applied to input a wheel during a test cycle.

2. Background Art

Laboratory testing of a wheel in a biaxial test machine may require that axial, or lateral, and radial wheel test load data be measured at a test track and translated for programing the biaxial test machine. This is performed by running a weighted prototype wheel through durability procedures while a wheel force transducer mounted on the wheel extracted spindle load data that was uploaded to a central server for analysis by engineering personnel. Wheel durability engineering personnel process data in time/history format into joint probability distributions used in block cycle test profiles for the biaxial test machine.

The data is based on spindle center loading but the test machine requires that inputs be translated into a tire sidewall input. The translation is based on an expectation of tire life and a necessity to run the tire against a drum to generate axial forces instead of using a tire patch (a footprint of a tire in contact with the ground), that increases tire temperature and wear.

Strain gauges may be attached to high-stress areas of a wheel that is mounted on a Flat-Trac® machine. A Flat-Trac® machine includes a moving belt against which a tire is pressed. The wheel may be loaded to reflect the axial and radial wheel test load data. The machine provides spindle load control and records outputs from the strain gauges.

The wheel is mounted on the biaxial wheel test machine and is loaded to reflect the axial and radial wheel test load data recorded by the Flat-Trac® machine. The wheel may be tilted to various camber, or tilt, angles while each axial and radial load pair is applied. Actual strain measurements are correlated with those recorded by the Flat-Trac® machine with the camber angles being compared with the loads to provide a simulation of track loads.

A process described in U.S. Pat. No. 6,813,938 to Schwendemann, issued on Nov. 9, 2004, proposes a simplification of the previously described correlation process. The Schwendemann patent is intended to enable the calculation of camber angles without having to apply strain gauges to a wheel and without having to use a Flat-Trac® machine. The Schwendemann process includes locating an additional load cell in a biaxial test machine to track camber load, and further includes using geometry to calculate a camber angle that matches a requested load pair.

There is a need for greater precision in determining the degree of wheel camber angle when measuring potential damage to a wheel.

SUMMARY OF THE INVENTION

According to one aspect of this development, a method is provided for determining camber angle on a biaxial wheel test machine that simulates loads experienced by a wheel under driving conditions. A dynamic roll radius value is determined with an axial load and a camber angle held constant and a change of radial position is determined in response to unit changes of a radial load. A radial stiffness value is developed by determining a ratio of the radial position change in response to unit changes of the radial load. A new dynamic roll radius value is determined as a function of the radial load and the radial stiffness value.

According to another aspect of this development, a method is provided for obtaining the aforementioned greater precision in determining the degree of wheel camber, or tilt, angle. The method controls a biaxial wheel test machine used for simulating loads experienced by a wheel under actual driving conditions. The test machine includes a circular drum, having vertical and horizontal axes, within which to receive a wheel. The wheel to be tested includes a bowl, a rim and a tire and has a central radial plane. A drive unit rotates the drum, which internally has a pair of spaced-apart, circumferentially disposed biaxial curb. The test machine further includes a vertical force actuator for controllably exerting a vertical force; a horizontal force actuator for controllably exerting a horizontal force; a pivot head; and a camber actuator to position the wheel about the pivot head to control wheel camber angle. The test machine also has a measuring unit to measure camber actuator force. The vertical and horizontal forces are applied to the wheel to force the tire against a biaxial curb and the drum to rotate the wheel with the hub and the drum.

One embodiment of the method for reducing inaccuracies in determining degrees of wheel camber, or tilt, angle includes steps of: adjusting the vertical force, the horizontal force, and the camber angle based on vertical and horizontal forces on a wheel that was previously determined during a road test; using the position of a point of application on the tire of a resultant force, created by a radial component reaction force and an axial component reaction force, as a control magnitude for adjusting the camber angle; measuring the force of the camber actuator and using the measured camber actuator force as a control magnitude for determining the point of the application of the resultant force upon the tire; calculating the minimum displacement between the application point of the resultant force and the central radial plane of the wheel by means of the formula $$Rs = \left[\frac{M_{F_S} + (F_a \times R_{dyn})}{F_{Rr}}\right] - a1$$

where:
  $R_S$=the minimum displacement between the application point of the resultant force and the central radial plane of the wheel;
  Mfs=the moment of force around the pivot head;
  $F_a$=the wheel axial component of reactive force;
  $R_{dyn}$=the dynamic roll radius of the tire;
  $F_r$=the wheel radial component of reactive force;
  a1=the minimum displacement between the pivot head and the tire center point; and reducing inaccuracies in camber angle determinations by calculating more accurate values of $R_{dyn}$, according to steps: (a) with axial, or lateral, load and camber angle held constant and the wheel rotating, measuring the change of radial position in response to unit changes of radial load; (b) calculating radial stiffness by determining the ratio of radial position change in response to unit changes of radial load; and (c) calculating a new $R_{dyn}$ value by multiplying radial load by the radial stiffness value;

The method further reduces inaccuracies in the minimum displacement between the application point of the resultant force and the central radial plane of the wheel by calculating more accurate values of $R_S$ according to steps: (d) with the camber angle held constant at zero degrees and the wheel rotating, measuring the changes of axial position in response to unit changes of axial load; (e) calculating zero degree axial stiffness by determining the ratio of axial position change in response to unit changes of axial load; (f) with the radial position held constant and the camber angle held at negative fifteen degrees, measuring the change of axial position in response to unit changes in axial load; (g) with the camber angle held constant at negative fifteen degrees, calculating the axial stiffness by determining the ratio of axial position change in response to unit changes of axial load; (h) averaging the values of the ratios that are based on both camber angles; and (i) multiplying the axial load by the average slope value and adding the new value to the original value of $R_S$.

To offset any error still remaining following the foregoing $R_S$ and $R_{dyn}$ corrections, the method also includes steps: (j) subtracting the mathematical and the strain-gauged, wheel-based solutions from the camber angle calculated for each load pair, $F_a$ and $F_r$, to determine empirical correction factors; (k) grouping the correction factors into families based on vehicle class and tire sidewall height; and (l) averaging the correction factors within each family to provide a generic machine correction factor.

BRIEF DESCRIPTION OF THE DRAWINGS

The FIGURE is partially a sectional view and partially a schematic diagram representing relevant portions of a biaxial wheel test machine.

DETAILED DESCRIPTION OF EMBODIMENTS OF THE INVENTION

Figure 1:
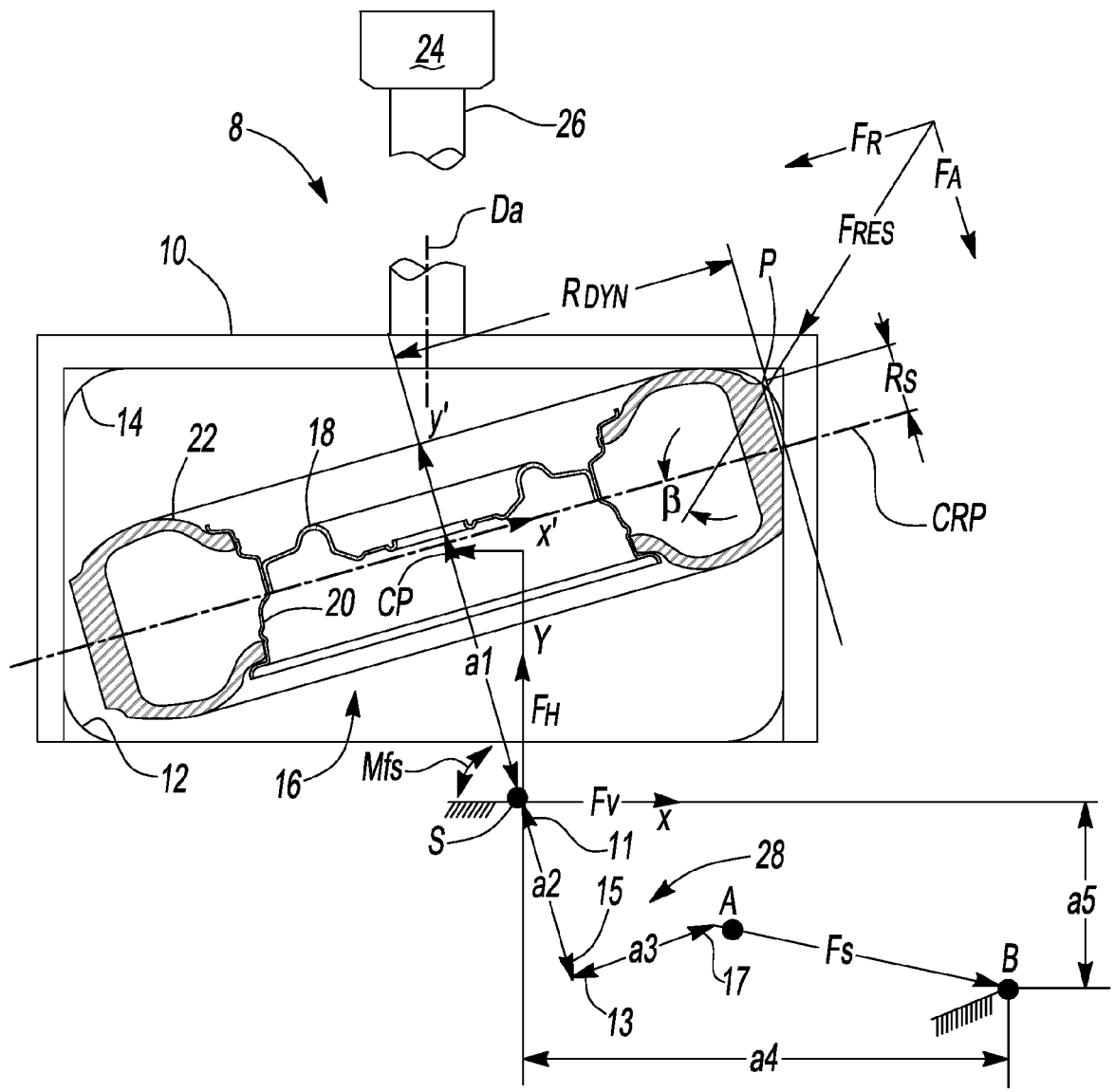

The present invention provides embodiments of methods for controlling a biaxial wheel test machine, generally indicated by the reference numeral 8, used for simulating loads experienced by a wheel under actual driving conditions to determine accurately degrees of camber, or tilt, angle of a wheel, generally indicated by the reference numeral 16, being tested. In a preferred embodiment of the test machine 8 controlled by methods of the present invention is illustrated by the FIGURE, which is partially a sectional view and partially a schematic diagram and does not show the test machine 8 in its entirety. The test machine 8 includes a circular drum 10, having vertical and horizontal axes, X and Y, respectively, in which to receive the wheel 16. The wheel 16 has a central radial plane CRP and includes a bowl 18, a rim 20 formed about the circumference of the bowl 18, and a tire 22 mounted on the rim 20. The drum 10 has internal circumferentially disposed biaxial curbs 12 and 14. The tire 22 of the wheel 16 to be tested is shown pressed against one of the curbs 14. The spacing between the biaxial curbs 12 and 14 is variable to accommodate wheels 16 of different sizes. The drum 10 is connected by a drive shaft 26 to a drive unit 24, which rotates the drum 10 about a drum rotational axis Da. The bowl 18 is releasably connected to a rotatable pivot head S, which is symbolically represented by a point identified by a reference letter S. The pivot head S is located at a displacement, represented by a double-ended arrow a1, from a center point CP of the wheel 16 and pivotally supports the wheel 16. A first lever arm, symbolically represented by a double-ended arrow a2, is connected at a first of its ends 11 to the pivot head S; and a second lever arm, symbolically represented by a double-ended arrow a3, is connected at a first of its ends 13 at an angle to a second end 15 of the first lever arm a2 to form a lever mechanism, generally indicated by the reference numeral 28. A second end 17 of the second lever arm a3 is connected to a bearing point A. As symbolically represented by an arrow identified by reference letters Fs, a camber actuator, such as a servohydraulic load cylinder, is connected between the bearing point A and a bearing point B to position the wheel 16 about the pivot head S and adjust wheel camber angle. The dimensions of the various elements depend on the properties of specific wheels being tested.

The test machine 8 has an x-y coordinate system having its origin at the pivot head S, which is the camber angle pivot point. An x-axis extends along the line indicated by a reference letter X and a y-axis extends parallel to the drum axis of rotation Da and is indicated by a reference letter Y. A vertical force actuator, symbolically indicated by an arrow $F_V$, is connected to controllably exert a vertical force upon the pivot head S; and a horizontal force actuator, symbolically indicated by an arrow $F_h$, is connected to controllably exert a horizontal force upon the pivot head S. These forces are communicated to the wheel 16.

The wheel 16 has an, x'-y' coordinate system having its origin at the center point CP of the wheel 16. An x'-axis extends in a radial direction in a plane defined by vectors representing forces $F_r$ and $F_a$ and by vectors representing forces $F_v$ and $F_h$ and is indicated by a reference letter X'. A y'-axis extends in an axial, or lateral, direction coinciding with the axis of rotation of the wheel 16 and is indicated by a reference letter Y'. As shown by the FIGURE, the rotational axis of the wheel 16 is tilted with respect to the y-axis by a camber angle; that is, the y'-axis is tilted with respect to the y-axis by the camber angle. The minimum displacement between a line parallel to the y-axis and passing through the pivot head S and a line parallel to the y-axis and passing through the bearing point B is indicated by a double-headed arrow a4. The minimum displacement between a line parallel to the x-axis and passing through the pivot head S and a line parallel to the x-axis and passing through the bearing point B is indicated by a double-headed arrow a5.

The reference characters a1, a2, a3, a4 and a5 represent test machine geometric constants. Their relationships with various forces to be discussed are shown by the following formulas, and the reference symbol γ is also defined.

$$\gamma = \text{TiltAngle} \times (\pi/180°)$$

$$F_a = -([(1+[-0.03\times\gamma^2]+[0.0006\times\gamma^4])\times F_v] + [([-0.254\times\gamma] + [0.0065\times\gamma^3])\times F_h])$$

$$F_r = -([(1+[-0.0379\times\gamma^2]+[0.0006\times\gamma^4])\times F_h] + [([-0.249\times\gamma] + [0.0065\times\gamma^3])\times F_v])$$

$$A_x = a2\times\sin(\gamma) + a3\times\cos(\gamma)$$

$$A_y = -a2\times\cos(\gamma) + a3\times\sin(\gamma)$$

$$F_S xy = \sqrt{(a4-A_x)^2 + (-a5-A_y)^2}$$

$$F_S x = \frac{(a4-A_x)}{F_S xy}$$

$$F_S y = \frac{(-a5-A_y)}{F_S xy}$$

$$M_{FS} = F_S \times [(a4\times F_S y) + (a5\times F_S x)]$$

A vertical, force actuator, such as a servohydraulic load cylinder and symbolically represented by a vector representing the force Fv, exerts a vertical force upon the pivot head S, and thus on the wheel 16, in a direction parallel to the x-axis;

and a similar but horizontal force actuator, symbolically represented by a vector representing the force $F_h$, exerts a horizontal force upon the pivot head S, and thus on the wheel 16, in a direction parallel to the y-axis. A control and evaluation unit (not shown) controls the amplitudes of the horizontal and vertical forces $F_h$ and $F_v$, respectively, and the camber angle based on horizontal and vertical forces determined during a previous road test. The position of an application point P of a resultant force $F_{res}$, created by wheel radial and axial component reaction forces $F_r$ and $F_a$, respectively, is used as a controlling magnitude for adjusting the camber angle. The relationship of $F_v$ and $F_h$ to $F_r$ and $F_a$ and to $\gamma$ is shown by the following formulas:

$$Fv = -Fr \cdot \cos(\gamma) + Fa \times \sin(\gamma) \text{ and}$$

$$Fh = -Fr \times \sin(\gamma) - Fa \times \cos(\gamma)$$

where:
- $F_v$=the vertical actuator force;
- $F_h$=the horizontal actuator force;
- $F_a$=the wheel axial component of reactive force;
- $F_r$=the wheel radial component of reactive force; and
- $\gamma$=Tilt Angle$\times(\pi/180°)$.

The dynamic roll radius of the wheel 16 is the minimum displacement between the axis of rotation Y' of the wheel and a line parallel to Y' and passing through the point P of application of the resulting reactive force $F_{res}$ on the tire 22 and is indicated by the reference letters $R_{dyn}$. As shown by the FIGURE, the tire 22 of the wheel 16 is in contact with, and is free to rotate with, the drum 10 and the biaxial curb 14 as the tire 22 is forced against them. As the camber actuator Fs exerts a force upon the bearing point B, a reaction force applied to the camber actuator Fs creates a moment of camber actuator force that causes lever arms a2 and a3 to revolve the wheel 16 about the pivot head S. Controlling the camber actuator Fs thus controls the camber angle.

The FIGURE shows a central radial plane CRP that is perpendicular to the axis of rotation Y' of the wheel 16 and passes through the center point CP of the wheel 16. It also shows a radial component vector representing a reaction force $F_r$, an axial component vector representing a reaction force $F_a$ and a vector $F_{res}$ representing a resultant reaction force created by the two component reaction forces $F_r$ and $F_a$. The axis of the resultant force $F_{res}$ intersects the central radial plane CRP of the wheel 16 at an angle $\beta$. The resultant force $F_{res}$ is applied to the tire 22 at a point P, the location of which is dependent on the camber angle. As shown by the FIGURE, there is a displacement $R_S$ representing the minimum displacement between the application point P of the resultant force $F_{res}$ and the central radial plane CRP of the wheel 16. The displacement $R_S$ varies in proportion to the camber angle. If the vertical axis X extended along the central radial plane CRP of the wheel 16, for example, the angles $\beta$ and, the force $F_a$, and the displacement $R_S$ would all be equal to zero.

The amount of force exerted by the camber actuator Fs upon the bearing point B is a factor needed to enable the position of the point P on the tire 22 of application of the resulting reactive force $F_{res}$ to be used as a control element. A preferred and simple means for determining the camber actuator force is to use a measuring unit such as a well-known capsule-type dynamometer (not shown). Determining the force in this manner at the camber actuator Fs rather than by using a pressure measurement reduces the possibility of obtaining measurements that have been corrupted by friction losses or measurement errors.

As mentioned in the Background of the Invention section, for some applications there is a need for higher precision in determining the degree of wheel camber angle than can be attained by the Schwendemann method. The goal is to maintain test machine inaccuracies at less than 0.2 degrees of camber angle during test cycles. The Schwendemann method uses a calculated value of $R_{dyn}$ based on a standard European formula $$R_{dyn} = \frac{|TireRadius \times 2 \times 3.05|}{2\pi} \qquad (1)$$

for the dynamic roll radius. The number 3.05 is derived from empirical testing of how tires compress, however; it does not provide a correct answer for all wheel and tire combinations. The Schwendemann method also uses a calculated value provided by the formula $$Rs = \left[\frac{M_{F_S} + (F_a \times R_{dyn})}{F_r}\right] - a1 \qquad (2)$$

where:
- $R_S$=the minimum displacement between the application point P of the resulting force $F_{res}$ and the central radial plane CRP of the wheel;
- Mfs=the moment of force around the pivot head S;
- $F_a$=the wheel axial component of reactive force;
- $R_{dyn}$=the dynamic roll radius of the tire;
- $F_r$=the wheel radial component of reactive force;
- a1=the minimum displacement between the pivot head S and the tire center point CP; and
- $\gamma$=Tilt Angle$\times(\pi/180°)$ to find the minimum displacement $R_S$ between the point P of application of the resultant reactive force $F_{res}$ on the tire 22 and the central radial plane CRP of the wheel 16. The methods of calculation do not account for relatively constant variations caused by tire flexing in response to varying forces applied to it under varying road conditions. Rather, the calculations produce only static approximations or averages. The less-than-desired precision in determining the dynamic roll radius $R_{dyn}$ stems from the fact that flexing of the tire portion of the wheel 16 causes attending variances in the radius of the wheel 16. The variances in radius increase with, but are not a linear function of, radial load. Likewise, the less-than-desired precision in determining the value of $R_S$ stems from the nonlinearity of tire dynamics and a lack of compensation for tire sidewall height. As the percentage of the dynamic roll radius $R_{dyn}$ represented by the tire 22 increases, tire resistance to axial deflection decreases. Inaccuracies in calculated values of $R_S$ therefore increase with increases in sidewall height as well as with increases in axial loads.

To improve precision of the values of $R_{dyn}$, a test wheel 16 is mounted in the drum 10 and run through a biaxial load file that sets the radial loads from zero to a maximum load expected during the test. The full radius of the wheel 16 can be determined by adding the radius of the bowl 18 to the sidewall height of the tire 22. Data corresponding to measured radial loads and wheel spindle positions are collected. The data can then be used to determine the dynamic roll radius $R_{dyn}$ for any radial load by subtracting the change in position at that load from the static radius of the wheel 16. As the camber angle is calculated for each load pair, a new value of $R_{dyn}$ will be an actual, rather then a potentially inaccurately calculated, dynamic roll radius $R_{dyn}$ at that load pair. Since, as shown by the foregoing formula indicated by the parenthesized numeral (2), the value of $R_S$ is a function of the value of $R_{dyn}$. Thus, an increase in the accuracy of the value of $R_{dyn}$ will increase the accuracy of the value of $R_S$.

As is the foregoing $R_{dyn}$ formula indicated by the parenthesized numeral (1), the foregoing $R_S$ formula indicated by the parenthesized (2) is a linear model of a nonlinear situation. A method for more accurately determining the value of $R_S$, involves calculating the value empirically. Axial tire stiffness is determined by mounting a test wheel 16 onto the test machine 8 and measuring the relationship between axial load and axial position using a radial load similar to a vehicle corner weight. Unlike the dynamic roll radius $R_{dyn}$, which does not depend on the camber angle, this information depends on the camber angle used. The information is then collected for three different passes, namely, with a camber angle of zero and with camber angles in extreme negative and positive directions. The information generated is then used to interpolate a more accurate value for $R_S$ for any combination of radial and axial load pairs. The process must be iterated if the $R_S$ value produces a camber angle divergent from the $R_S$ input. In addition to tire stiffness, tire pressure is another factor taken into consideration by the present process.

An embodiment of a method is provided for controlling the previously described biaxial wheel test machine 8 and for reducing inaccuracies in determining degrees of wheel camber angle. The method includes the following steps:

a. adjusting the vertical force, the horizontal force, and the camber angle based on wheel vertical and horizontal forces previously determined during a road test;

b. using the position of a point of application on the tire of a resultant force of a component wheel radial force and a component wheel axial force as a control magnitude for adjusting the camber angle;

c. measuring the force of the camber actuator and using the measured camber actuator force as a control magnitude for determining the point of the application of the resultant force upon the tire;

d. calculating the minimum displacement between the application point of the resultant force and the central radial plane of the wheel by means of the formula $$Rs = \left[\frac{M_{F_S} + (Fa \times R_{dyn})}{Fr}\right] - a1$$

where:
Rs=the minimum displacement between the application point P of the resultant force $F_{res}$ and the central radial plane CRP of the wheel;
Mfs=the moment of force around the pivot head S;
$F_a$=the wheel axial component of reactive force;
$R_{dyn}$=the dynamic roll radius of the tire;
$F_r$=the wheel radial component of reactive force;
a1=the minimum displacement between the pivot head S and the tire center point CP; and e. reducing inaccuracies in camber angle determinations by calculating more accurate values of $R_{dyn}$ with axial load and camber angle held constant and measuring the change of radial position in response to unit changes of radial load;

f. calculating radial stiffness by determining the ratio of radial position change in response to unit changes of radial load; and g. calculating a new $R_{dyn}$ value by multiplying radial load by the radial stiffness value.

Further reductions of inaccuracies in camber angle determinations can be obtained by calculating more accurate values of $R_S$ according to the following steps:

a. With the wheel inside the turning drum 10 and the camber angle held constant at zero degrees, measuring the changes of axial position in response to unit changes of axial load;

b. calculating zero degree axial stiffness by determining the ratio of axial position change in response to unit changes of axial load;

c. with a wheel inside the turning drum 10, the radial position held constant, and the camber angle held at negative fifteen degrees, measuring the change of axial position in response to unit changes in axial load;

d. calculating the axial stiffness at a camber angle of negative fifteen degrees by determining the ratio of axial position change in response to unit changes of axial load;

e. averaging the values of the ratios that are based on both camber angles; and f. calculating a new value of $R_S$ by multiplying the axial load by the average slope value and adding the new value to the original value of $R_S$.

Offsetting any remaining inaccuracies can be accomplished by the steps:

a. subtracting the mathematical and the strain-gauged, wheel-based solutions from the camber angle calculated for each load pair, $F_a$ and $F_r$, to determine empirical correction factors;

b. grouping the correction factors into families based on vehicle class and tire sidewall height; and c. averaging the correction factors within each family to provide a generic test machine correction factor.

Another embodiment of a method is provided for controlling the previously described biaxial wheel test machine 8 and for reducing inaccuracies in determining degrees of wheel camber angle. The method includes the following steps:

a. adjusting the vertical force, the horizontal force, and the camber angle based on wheel vertical and horizontal forces previously determined during a road test;

b. using the position of a point of application on the tire of a resultant force of a component wheel radial force and a component wheel axial force as a control magnitude for adjusting the camber angle;

c. measuring the force of the camber actuator and using the measured camber actuator force as a control magnitude for determining the point of the application of the resultant force upon the tire;

d. adjusting the vertical force, the horizontal force and the camber angle until an unambiguous solution for the following formulas is reached:

$$Rs = \left[\frac{M_{F_S} + (Fa \times R_{dyn})}{Fr}\right] - a1$$

$$Fv = -Fr - \cos(\gamma) + Fa \times \sin(\gamma)$$

and $$Fh = -Fr \times \sin(\gamma) - Fa \times \cos(\gamma)$$

where:
Rs=the minimum displacement between the application point of the resultant force and the central radial plane of the wheel;

Fv=the vertical force; and

Fh=the horizontal force;

$M_{Fs}$=the moment of force around the pivot head;

$F_a$=the wheel axial component of reactive force;

$R_{dyn}$=the dynamic roll radius of the tire;

$F_r$=the wheel radial component of reactive force;

a1=the minimum displacement between the pivot head and the tire center point;

$\gamma$=Tilt Angle$\times(\pi/180\square)$; and e. reducing inaccuracies in camber angle determinations by calculating more accurate values of $R_{dyn}$ with axial load and camber angle held constant and measuring the change of radial position in response to unit changes of radial load;

f. calculating radial stiffness by determining the ratio of radial position change in response to unit changes of radial load; and g. calculating a new $R_{dyn}$ value by multiplying radial load by the radial stiffness value.

Further reductions of inaccuracies in camber angle determinations can be obtained by calculating more accurate values of $R_S$ according to the following steps:

a. with the wheel inside the turning drum 10 and the camber angle held constant at zero degrees, measuring the changes of axial position in response to unit changes of axial load;

b. calculating zero degree axial stiffness by determining the ratio of axial position change in response to unit changes of axial load;

c. with a wheel inside the turning drum 10, the radial position held constant, and the camber angle held at negative fifteen degrees, measuring the change of axial position in response to unit changes in axial load;

d. calculating the axial stiffness at a camber angle of negative fifteen degrees by determining the ratio of axial position change in response to unit changes of axial load;

e. averaging the values of the ratios that are based on both camber angles; and f. calculating a new value of $R_S$ by multiplying the axial load by the average slope value and adding the new value to the original value of $R_S$.

Offsetting any remaining inaccuracies can be accomplished by the steps:

a. subtracting the mathematical and the strain-gauged, wheel-based solutions from the camber angle calculated for each load pair, $F_a$ and $F_r$, to determine empirical correction factors;

b. grouping the correction factors into families based on vehicle class and tire sidewall height; and c. averaging the correction factors within each family to provide a generic test machine correction factor.

Yet another embodiment of a method is provided for controlling the previously described biaxial wheel test machine 8 and for reducing inaccuracies in determining degrees of wheel camber angle. The method includes the following steps:

a. adjusting the vertical force, the horizontal force, and the camber angle based on wheel vertical and horizontal forces previously determined during a road test;

b. using the position of a point of application on the tire of a resultant force of a component wheel radial force and a component wheel axial force as a control magnitude for adjusting the camber angle;

c. calculating the minimum displacement between the application point of the resultant force and the central radial plane of the wheel by means of the formula $$Rs = \left[\frac{M_{F_S} + (Fa \times R_{dyn})}{Fr}\right] - a1$$

where:

Rs=the minimum displacement between the application point of the resultant force and the central radial plane of the wheel;

$M_{Fs}$=the moment of force around the pivot head;

$F_a$=the wheel axial component of reactive force;

$R_{dyn}$=the dynamic roll radius of the tire;

$F_r$=the wheel radial component of reactive force;

a1=the minimum displacement between the pivot head and the tire center point; and d. reducing inaccuracies in camber angle determinations by calculating more accurate values of $R_{dyn}$ with axial load and camber angle held constant and measuring the change of radial position in response to unit changes of radial load;

e. calculating radial stiffness by determining the ratio of radial position change in response to unit changes of radial load; and f. calculating a new $R_{dyn}$ value by multiplying radial load by the radial stiffness value.

Further reductions of inaccuracies in camber angle determinations can be obtained by calculating more accurate values of $R_S$ according to the following steps:

a. with the wheel inside the turning drum 10 and the camber angle held constant at zero degrees, measuring the changes of axial position in response to unit changes of axial load;

b. calculating zero degree axial stiffness by determining the ratio of axial position change in response to unit changes of axial load;

c. with a wheel inside the turning drum 10, the radial position held constant, and the camber angle held at negative fifteen degrees, measuring the change of axial position in response to unit changes in axial load;

d. calculating the axial stiffness at a camber angle of negative fifteen degrees by determining the ratio of axial position change in response to unit changes of axial load;

e. averaging the values of the ratios that are based on both camber angles; and f. calculating a new value of $R_S$ by multiplying the axial load by the average slope value and adding the new value to the original value of $R_S$.

Offsetting any remaining inaccuracies can be accomplished by the steps:

a. subtracting the mathematical and the strain-gauged, wheel-based solutions from the camber angle calculated for each load pair, $F_a$ and $F_r$, to determine empirical correction factors;

b. grouping the correction factors into families based on vehicle class and tire sidewall height; and c. averaging the correction factors within each family to provide a generic test machine correction factor.

Still another embodiment of a method is provided for controlling the previously described biaxial wheel test machine 8 and for reducing inaccuracies in determining degrees of wheel camber angle. The method includes the following steps:

a. adjusting the vertical force, the horizontal force, and the camber angle based on wheel vertical and horizontal forces previously determined during a road test;

b. using the position of a point of application on the tire of a resultant force of a component wheel radial force and a component wheel axial force as a control magnitude for adjusting the camber angle;

c. adjusting the vertical force, the horizontal force and the camber angle until an unambiguous solution for the following formulas is reached:

$$Rs = \left[\frac{M_{F_S} + (Fa \times R_{dyn})}{Fr}\right] - a1$$

$$Fv = -Fr - \cos(\gamma) + Fa \times \sin(\gamma)$$

and $$Fh = -Fr \times \sin(\gamma) - Fa \times \cos(\gamma)$$

where:
Rs=the minimum displacement between the application point of the resultant force and the central radial plane of the wheel;
Fv=the vertical force; and
Fh=the horizontal force;
$M_{F_S}$=the moment of force around the pivot head;
$F_a$=the wheel axial component of reactive force;
$R_{dyn}$=the dynamic roll radius of the tire;
$F_r$=the wheel radial component of reactive force;
a1=the minimum displacement between the pivot head and the tire center point;
γ=Tilt Angle×(π/180°); and d. reducing inaccuracies in camber angle determinations by calculating more accurate values of $R_{dyn}$ with axial load and camber angle held constant and measuring the change of radial position in response to unit changes of radial load;

e. calculating radial stiffness by determining the ratio of radial position change in response to unit changes of radial load; and f. calculating a new $R_{dyn}$ value by multiplying radial load by the radial stiffness value.

Further reductions of inaccuracies in camber angle determinations can be obtained by calculating more accurate values of $R_S$ according to the following steps:

a. with the wheel inside the turning drum 10 and the camber angle held constant at zero degrees, measuring the changes of axial position in response to unit changes of axial load;

b. calculating zero degree axial stiffness by determining the ratio of axial position change in response to unit changes of axial load;

c. with a wheel inside the turning drum 10, the radial position held constant, and the camber angle held at negative fifteen degrees, measuring the change of axial position in response to unit changes in axial load;

d. calculating the axial stiffness at a camber angle of negative fifteen degrees by determining the ratio of axial position change in response to unit changes of axial load;

e. averaging the values of the ratios that are based on both camber angles; and f. calculating a new value of $R_S$ by multiplying the axial load by the average slope value and adding the new value to the original value of $R_S$.

Offsetting any remaining inaccuracies can be accomplished by the steps:

a. subtracting the mathematical and the strain-gauged, wheel-based solutions from the camber angle calculated for each load pair, $F_a$ and $F_r$, to determine empirical correction factors;

b. grouping the correction factors into families based on vehicle class and tire sidewall height; and c. averaging the correction factors within each family to provide a generic test machine correction factor.

While the best mode for carrying out the invention has been described in detail, those familiar with the art to which this invention relates will recognize various alternative designs and embodiments for practicing the invention as defined by the following claims.

What is claimed:

1. A method for determining camber angle on a biaxial wheel test machine that simulates loads experienced by a wheel under driving conditions comprising:
   determining a dynamic roll radius value with an axial load and a camber angle held constant and determining a change of radial position in response to unit changes of a radial load;
   determining a radial stiffness value by determining a ratio of the radial position change in response to unit changes of the radial load; and
   developing a new dynamic roll radius value as a function the radial load and the radial stiffness value.

2. A method for controlling a biaxial wheel test machine used for simulating loads experienced by a wheel under actual driving conditions, the test machine comprising a circular drum, having vertical and horizontal axes, in which to receive a wheel, which has a central radial plane and which has a bowl, a rim and a tire, to be tested; a drive unit to rotate the drum, the drum internally having at least one circumferentially disposed biaxial curb; the test machine further comprising a vertical force actuator for controllably exerting a vertical force; a horizontal force actuator for controllably exerting a horizontal force; a pivot head; and a camber actuator to position the wheel about the pivot head to control wheel camber, or tilt, angle, the vertical and horizontal forces being applied to the wheel to force the tire against a biaxial curb and the drum to rotate the wheel with the curb and the drum, wherein the method comprises steps:

a. adjusting the vertical force, the horizontal force, and the camber angle based on wheel vertical and horizontal forces previously determined during a road test;

b. using the position of a point of application on the tire of a resultant force of a component wheel radial force and a component wheel axial force as a control magnitude for adjusting the camber angle;

c. measuring the force of the camber actuator and using the measured camber actuator force as a control magnitude for determining the point of the application of the resultant force upon the tire;

d. calculating the minimum displacement between the application point of the resultant force and the central radial plane of the wheel by means of the formula $$Rs = \left[\frac{M_{F_S} + (Fa \times R_{dyn})}{Fr}\right] - a1$$

where:
Rs=the minimum displacement between the application point of the resultant force and the central radial plane of the wheel;
Mfs=the moment of force around the pivot head;
$F_a$=the wheel axial component of reactive force;
$R_{dyn}$=the dynamic roll radius of the tire;
$F_r$=the wheel radial component of reactive force;

a1=the minimum displacement between the pivot head and the tire center point, and e. reducing inaccuracies in camber angle determinations by calculating more accurate values of $R_{dyn}$ with axial load and camber angle held constant and measuring the change of radial position in response to unit changes of radial load; (f) calculating radial stiffness by determining the ratio of radial position change in response to unit changes of radial load; and (g) calculating a new $R_{dyn}$ value by multiplying radial load by the radial stiffness value.

3. The method of claim 2, further comprising steps: (h) with the camber angle held constant at zero degrees, measuring the changes of axial position in response to unit changes of axial load; (i) calculating zero degree axial stiffness by determining the ratio of axial position change in response to unit changes of axial load; (j) with the radial position held constant and the camber angle held at negative fifteen degrees, measuring the change of axial position in response to unit changes in axial load; (k) with the camber angle held constant at negative fifteen degrees, calculating the axial stiffness by determining the ratio of axial position change in response to unit changes of axial load; (l) averaging the values of the ratios that are based on both camber angles; and (m) multiplying the axial load by the average slope value and adding the new value to the original value of $R_S$, thereby further reducing inaccuracies in the minimum displacement between the application point of the resultant force and the central radial plane of the wheel by calculating more accurate values of $R_S$.

4. The method of claim 3, further comprising steps: (n) subtracting the mathematical and the strain-gauged, wheel-based solutions from the camber angle calculated for each load pair, $F_a$ and $F_r$, to determine empirical correction factors; (o) grouping the correction factors into families based on vehicle class and tire sidewall height; and (p) averaging the correction factors within each family to provide a generic test machine correction factor, thereby offsetting any remaining inaccuracies.

5. A method for controlling a biaxial wheel test machine used for simulating loads experienced by a wheel under actual driving conditions, the test machine comprising a circular drum, having vertical and horizontal axes, in which to receive a wheel, which has a central radial plane and which has a bowl, a rim and a tire, to be tested; a drive unit to rotate the drum, the drum internally having at least one circumferentially disposed biaxial curb; the test machine further comprising a vertical force actuator for controllably exerting a vertical force; a horizontal force actuator for controllably exerting a horizontal force; a pivot head; and a camber actuator to position the wheel about the pivot head to control wheel camber, or tilt, angle, the vertical and horizontal forces being applied to the wheel to force the tire against a biaxial curb and the drum to rotate the wheel with the curb and the drum, wherein the method comprises steps:

a. adjusting the vertical force, the horizontal force, and the camber angle based on wheel vertical and horizontal forces previously determined during a road test;

b. using the position of a point of application on the tire of a resultant force of a component wheel radial force and a component wheel axial force as a control magnitude for adjusting the camber angle;

c. measuring the force of the camber actuator and using the measured camber actuator force as a control magnitude for determining the point of the application of the resultant force upon the tire;

d. adjusting the vertical force, the horizontal force and the camber angle until an unambiguous solution for the following formulas is reached:

$$Rs = \left[\frac{M_{F_S} + (Fa \times R_{dyn})}{Fr}\right] - a1$$

$$Fv = -Fr - \cos(\gamma) + Fa \times \sin(\gamma)$$

and $$Fh = -Fr \times \sin(\gamma) - Fa \times \cos(\gamma)$$

where:
Rs=the minimum displacement between the application point of the resultant force and the central radial plane of the wheel;
Fv=the vertical force;
Fh=the horizontal force;
$M_{F_S}$=the moment of force around the pivot head;
$F_a$=the wheel axial component of reactive force;
$R_{dyn}$=the dynamic roll radius of the tire;
$F_r$=the wheel radial component of reactive force;
a1=the minimum displacement between the pivot head and the tire center point, and
$\gamma$=Tilt Angle×($\pi$/180°)

e. reducing inaccuracies in camber angle determinations by calculating more accurate values of $R_{dyn}$ with axial load and camber angle held constant; measuring the change of radial position in response to unit changes of radial load; (f) calculating radial stiffness by determining the ratio of radial position change in response to unit changes of radial load; and (g) calculating a new $R_{dyn}$ value by multiplying radial load by the radial stiffness value.

6. The method of claim 5, further comprising steps: (h) with the camber angle held constant at zero degrees, measuring the changes of axial position in response to unit changes of axial load; (i) calculating zero degree axial stiffness by determining the ratio of axial position change in response to unit changes of axial load; (j) with the radial position held constant and the camber angle held at negative fifteen degrees, measuring the change of axial position in response to unit changes in axial load; (k) with the camber angle held constant at negative fifteen degrees, calculating the axial stiffness by determining the ratio of axial position change in response to unit changes of axial load; (l) averaging the values of the ratios that are based on both camber angles; and (m) multiplying the axial load by the average slope value and adding the new value to the original value of $R_S$, thereby further reducing inaccuracies in the minimum displacement between the application point of the resultant force and the central radial plane of the wheel by calculating more accurate values of $R_S$.

7. The method of claim 6, further comprising steps: (n) subtracting the mathematical and the strain-gauged, wheel-based solutions from the camber angle calculated for each load pair, $F_a$ and $F_r$, to determine empirical correction factors; (o) grouping the correction factors into families based on vehicle class and tire sidewall height; and (p) averaging the correction factors within each family to provide a generic test machine correction factor, thereby offsetting any remaining inaccuracies.

* * * * *